United States Patent Office 2,835,593
Patented May 20, 1958

2,835,593

FLAVOR PRODUCT AND PROCESS

Irving I. Rusoff, Park Ridge, N. J., assignor to General Foods Corporation, White Plains, N. Y., a corporation of Delaware No Drawing. Application September 23, 1957
Serial No. 685,414

14 Claims. (Cl. 99—140)

This invention relates to artificial chocolate flavor and to a process for making the same. More particularly, the invention is concerned with an artificial chocolate flavor component which may be used as a base flavor factor in combination with other flavor factors such as astringency, bitterness, and the like, or which may be used alone and without such other factors to enhance the flavor of natural chocolate products. This application is a continuation-in-part of my earlier filed co-pending application Serial No. 655,200, filed April 26, 1957, and combining the subject matter of my then co-pending applications (since abandoned) Serial No. 453,413, filed August 31, 1954, and Serial No. 512,887, filed June 2, 1955.

Flavor derived from cacao for manufacture of chocolate and cocoa products involves numerous widely separated and distinct steps commencing at the plantations in tropical environs and continuing until incorporation of the flavor in a finished product which can be a confectionery, beverage, or like food product. From the time cacao seeds are removed from their pods and are subjected to well-known processes which include fermentation, drying, grading, etc., obscure chemical reactions take place that condition the beans for roasting, during which the characteristic flavor of chocolate is developed. While progress has been made in the art of developing natural chocolate flavor, the processes involved require a high degree of control and are widely separated, the flavor varies with the source of the cacao, and the cost is excessive.

The invention has for its primary object the elimination of reliance on cacao as the sole source of chocolate flavor by development of such flavor from a wide variety of other raw materials. It is a particular object of the present invention to produce a flavor having the butyral notes or scents of premium chocolate and having the base flavor of chocolate prepared from cocoa.

It has been discovered that a reaction mixture containing the free fatty acids of hydrolyzed milk fat, partially hydrolyzed milk protein and milk sugar can be reacted to produce an imitation or artificial chocolate flavor component having the butyral note character associated with a "cowy" flavor. These butyral notes in combination with the base flavor factor provide an over-all organoleptic effect highly reminiscent of milk chocolate. Thus, the base flavor factor and the reaction product stemming from the presence of the milk fat hydrolyzate in the reaction mixture prior to reaction contribute to produce the desired flavor. By "base flavor factor" is meant a flavor component which may be used in combination with bitterness, astringency and other flavor factors to provide an imitation or artificial chocolate flavor. The base flavor factor may also be employed to enhance the flavor of natural chocolate products. The base flavor factor provides fullness and body which levels out and prolongs the taste sensation and lends a butyral character sought for in milk chocolate and other chocolate flavored food products.

The reaction to develop the above-described base flavor factor is carried out by the application of heat to a mixture of the reagents at a temperature and for a time sufficient to produce the base flavor factor in a substantially anhydrous condition at least at the end of the reaction. The reaction is carried out at a temperature of 120°–150° C., the time for such reaction varying inversely with temperature. Any one of a number of well-known apparatus may be employed to carry out the reaction such as a spray dryer, a pan roaster, a drum dryer, and the like. The reaction which results in the production of the base flavor component appears to be accompanied by a substantial decrease in the measurable amino nitrogen and reducing sugars in the reaction mixture.

The protein degradation technique employed herein to produce the partially hydrolyzed milk protein may be enzymatic, acidic, or alkaline, although it is preferred for the purpose of the present process that enzymatic or acidic hydrolysis be utilized. Of these protein hydrolysis methods that which is most preferred is the one employing enzymes. Such enzymes include the proteolytic enzymes such as trypsin, rennin, pepsin, erepsin, papain, bromelin, and the like. The use of alkaline degradation of the protein frequently results in the development of undesirable off-flavors in the final product, the artificial base flavor factor. Both alkaline and acid degradation are more difficult to control as compared with the enzyme degradation, require expensive, corrosion-proof equipment and, moreover, in some cases destroy certain amino acids which as set forth hereinafter are desired from the standpoint of obtaining best results. The degree of hydrolysis or proteolysis required in the present invention is substantially between 8% and 55%, viz., 8–55% of the total nitrogen in the hydrolyzate is amino nitrogen. Generally, it has been found that as the degree of proteolysis increases, the flavor intensity of the base flavor factor also increases.

It is believed that the degree of protein hydrolysis employed as described above is such that the peptides in the protein hydrolyzates are di-, tri-, and the somewhat more complex peptides which can best be described as "oligopeptides." The term "oligopeptides" is employed herein to denote di-, tri-, and up to penta- and hexapeptides. It has been found that substantially unhydrolyzed proteins on the one hand and amino acids on the other hand are incapable of reaction with the reducing sugars to provide the base flavor factor and that partially hydrolyzed protein is essential to provide said factor; best results are obtained with oligopeptides. However, some amino acids such as alpha-amino-n-butyric acid, histidine, alanine, arginine, aspartic acid, glycine, glutamic acid, valine, phenylalanine, proline, lysine, iso-leucine, leucine, threonine, tyrosine, and tryptophane, when present at the time of reacting the oligopeptides with the reducing sugars result in a considerably enhanced base flavor factor. Of these amino acids, phenylalanine and threonine are particularly preferred.

The preferred hydrolysis of the milk fat involves the use of a lipase to split off free fatty acids having fragrant butter acids including butyric, caproic, acetic and capric acids. However, hydrolysis of the milk fat to yield free fatty acids can be practiced in the present invention without a lipolytic catalyst, although a catalyst such as a lipase or acids are preferably employed to catalyze the splitting of the "butter" acids; also high temperature and pressure without a catalyst can also be employed to split these acids from the milk fat. Among the lipolytic catalysts most preferred are the enzymes trypsin and pancreatin which advantageously can also serve to hydrolyze the milk protein prior to reaction.

The preferred source of reagents is whole milk. Advantageously, whole milk includes abundant quantities of lactose, a reducing sugar, as well as milk proteins and milk fat, so that the base flavor factor can be obtained from a single raw material by hydrolyzing the milk protein and the milk fat and then reacting the digest at an elevated temperature. However, non-fat milk solids can be separated from the milk fat and the non-fat milk solids and milk fat can be digested separately of each other and then combined as a reaction mixture containing the protein and fat hydrolyzates.

The above-specified operable range of partial hydrolysis for milk proteins, viz., 8–55%, is an expression of the percent hydrolysis within which all of the proteins tested have been found to yield the base flavor factor under the reaction conditions of the present invention. Partial degradation of reconstituted skim and whole milk from 8–55% hydrolysis results in increased flavor levels as proteolysis increases; however, prolonged digestion periods and relatively high levels of enzyme, e. g., trypsin, are required to achieve over 20% hydrolysis, and since base flavor of adequate strength is produced at the lower levels of 8–20% hydrolysis and this degree of hydrolysis is obtained in a relatively short period, this latter narrower range is preferred from a practical operating standpoint.

As indicated herein, percent hydrolysis is intended to mean the percent of total nitrogen which is amino nitrogen, the former being determined by the Kjeldahl method and the latter being determined by the formol method.

In the work described herein, amino nitrogen was determined by the method described in David M. Greenberg's "Amino Acids and Proteins," Charles C. Thomas, Springfield, Illinois (1951) on pages 80, 81 and 246. Another formol titration method is that developed by Sorenson and described in the "Official Methods of Analysis of the Association of Official Agricultural Chemists," 7th ed., A. O. A. C., Washington, D. C. (1950), on page 365. Generally, in the case of pure proteins, formol nitrogen determination by the Greenberg method can be converted to Sorenson values by multiplying the Greenberg values by the factor 0.56. With proteins in a highly buffered system such as cows' milk, this conversion factor cannot be employed because values provided by the two different methods of analysis do not differ proportionately as they do with pure protein.

As indicated above, the reagents are heated at a temperature and for a time sufficient to create a substantially anhydrous condition at least at the end of the reaction. It appears that the properly mixed reactants require removal of sufficient quantities of water to provide a substantially anhydrous somewhat molten mixture for roasting to develop the artificial chocolate flavor of the present invention. However, the term "substantially anhydrous" is not meant to exclude the presence of some water in solution. In fact, a small amount of water is formed continuously during the course of the reaction, which fact alone is sufficient to preclude a completely anhydrous molten state at the end of the reaction. No analytical methods are available which permit determining with accuracy the maximum amount of water permissible at the end of the reaction. Good results have been obtained when the end product at the reaction temperature contained sufficient moisture to render it more or less tacky in nature, and I believe that as much as 5–10% moisture may have been present in some of such cases. These figures cannot be determined definitely, however, and in practice it is satisfactory to observe the rule that the product upon cooling to room temperature is substantially solid and substantially dry to the touch. The term "substantially anhydrous" is to be understood to include the presence of moisture within this limitation.

As aforementioned, the base flavor factor of the present invention can be combined with various other flavor factors of chocolate such as bitterness, astringency, aroma, and like factors in the preparation of an artificial chocolate flavor. The bitterness, astringency, aroma, and like factors, whether employed separately or in combination, fail to provide an artificial chocolate flavor but when one or more of these factors is combined with the base flavor factor of the present invention the taste sensation is leveled off and prolonged because of the fullness and body provided by the base flavor factor. The base flavor factor can be regarded as a background against which the more distinctive flavor factors such as bitterness, astringency, aroma and the like can be better appreciated.

Bitterness may be provided by the addition of bitter alkaloids such as caffein, theobromine, quinine, and the like. Other bitterness flavor factors that may be employed are the bitter polyacetates of polyhydric compounds such as the monosaccarides, glucose and levulose; the disaccharides, sucrose, lactose and maltose; the polyhydric alcohols, such as sorbitol and mannitol. Included in this class of bitterness factors are sucrose octaacetate, glucose triacetate, glucose tetraacetate, glucose pentaacetate, levulose triacetate, levulose tetraaceatte, levulose pentaacetate, maltose octaacetate, sorbitol hexaacetate. Generally, the beta isomer of the polyacetates is much more bitter than the alpha isomer. Another class of bitterness flavor factors which may be employed are the bitter glucosides, such as quassin, naringin, the alpha-phenol-glucoside, beta-phenol-glucoside, 2,3,5,6-tetra-acetyl-alpha-phenol-glucoside, 2,3,5,6-tetra-acetyl-beta-phenol-glucoside, 2,3,5,6-tetra-acetyl-alpha-methyl-glucoside, 2,3,5,6-tetra-acetyl-beta-methyl-glucoside. Still another group of bitterness flavor factors are the bitter acetonylated sugars such as diacetone-glucose, 3-acetyl-diacetone-glucose, 3-acetyl-monoacetone-glucose, 3-benzoyl-diacetone-glucose, and 6-benzoyl-monoacetone-glucose. Still another class of bitter flavor factors are salts and esters of inorganic acids such as dulcitol pentanitrate, potassium sulfate, iso-amyl potassium sulfate, methylhexylcarbinol potassium sulfate.

Astringency may be provided by employing various tannins or tannates obtained by infusion or evaporation from wood, leaves or fruit of plants, e. g., extracts of the heartwood of acacias such as *Acacia catechu* and *Acacia catechu sundra* which are broadly referred to in the trade as "cutch," and the galls of oak, sumac, etc. Such astringency factors are generally water-soluble and include catechin having the formula $C_{15}H_{14}O_6$. Included in this class of compounds are dl-catechol, d-catechol and d-epicatechol. Among some of the useful commercially available astringency factors are various powdered products such as cocoa tannins, catechu gum, gambir gum, rhatany root, eyebright herb, white oak bark, witch hazel bark, quebracho wood extract, chestnut leaves, red oak bark, black kino gum and gum myrrh. Other astringent materials include the alums such as sodium, potassium, ammonium, and like alums.

Chocolate aroma materials that can be employed in combination with the base flavor factor of the present invention, preferably along with the bitterness and astringency flavor factors described above, include aromatic materials derived from chocolate liquor, cocoa beans, cocoa powder by distillation, solvent extraction, and the like. In order to have a completely artificial chocolate flavor, however, one may employ a mixture of oil of coriander, vanillin, ethyl vanillin, oil of nutmeg, cinnamon and other essential oils which provide an aromatic principle similar to that of natural chocolate.

The base flavor factor resulting from the process of the invention is a powdery, friable material which is substantially soluble in aqueous medium such as water, milk, and the like. The product is capable of incorporation into a number of food products, either as the base flavor factor in an artificial chocolate flavor or to enhance the flavor of natural chocolate. The product contains buttery aromas suggestive of the cowy butyral character sought for in milk chocolate, in combination with the flavor of the base acids to produce an over-all organoleptic sensation quite like that of quality chocolate. The base flavor factor of the present invention alone or with other flavor factors of chocolate can be included in a wide variety of confectionery products such as chocolate bars, candy coatings, cocoa powders for milk drinks and baked goods. Advantageously, the product may be combined with fats such as cocoa butter or with other fats and oils.

The following examples illustrate embodiments of the invention, but it is to be understood that these examples are for purposes of illustration and that the invention is not limited thereto, since various changes can be made by those skilled in the art without departing from its scope and spirit.

*Example 1*

50 gallons of pasteurized whole cows' milk were heated to 47° C. in a stainless steel steam jacketed kettle. The heated whole milk was then adjusted from an original pH of 6.75 to a pH of 8.65 using a 10% aqueous solution of sodium hydroxide. To this was added 169 gms. of pancreatin (macerated bovine pancreas gland), the pancreatin having been previously dispersed in cold water prior to addition of the milk. The batch was then allowed to digest while maintaining this temperature of 47° C. for 6 hours. At various intervals sufficient sodium hydroxide solution was added to readjust the pH of the digest to optimal enzymatic digestion (pH 7.0 and above). The percent hydrolysis was calculated from formol nitrogen determinations (using the A. O. A. C. method) and the total nitrogen determination of Kjeldahl. At zero time of digestion the percent hydrolysis of the batch was 3.73%; after 30 minutes the percent hydrolysis was 5.42%; after 60 minutes the percent hydrolysis was 5.90%; after 90 minutes the percent hydrolysis was 6.69%; after 120 minutes the percent hydrolysis was 6.85%; after 165 minutes the percent hydrolysis was 6.98%; after 220 minutes the percent hydrolysis was 8.33%. Throughout the course of the digestion the lipase activity of the pancreatin in hydrolyzing the milk fat to various fatty acids causes the pH of the batch to drop more than is the case if only a protease were used. Accordingly, instead of hydrolyzing both the milk protein and the milk fat concurrently, an alternative procedure which could be used would be to digest the milk with some proleolytic enzyme and then following this digestion with a lipase such as pancreatin, castor bean lipase, etc. In any event, throughout the lipolysis the milk fat is hydrolyzed to yield the butter acids, butyric, caproic and other fatty acid associated with a butyral character such as acetic and capric acid. Throughout the course of lipolysis the pH of the digest should be maintained at a pH of 7 and above in order to assure sufficient lipolysis of the milk fat while at the same time providing a substantial degree of proteolysis to assure the creation of the flavor producing reagents in the digest.

The digest after 6 hours (approximately 10% hydrolysis) was then heated to 90° C. for 15 minutes to deactivate the enzyme. The heated batch at 10% solids concentration was then introduced to a spray dryer. Portions of the batch were spray dried at various temperatures in each case producing substantially anhydrous reaction products which varied from light yellow to a dark brown in color as the temperature was elevated. It was observed that, as the flavor product produced was of an intermediate shade of color best described as tan, "optimal buttery" aroma yielding a favorable "cowy" scent was noted. Elevated temperatures producing a very dark brown colored roast are preferably avoided since much of the aroma thus developed is lost through evaporation. On the other hand, too light a color (though also containing a pleasing butyral type aroma in the product) was not accompanied by the desired base flavor.

While it is difficult to recite the spray drying temperature experienced with any degree of specificity, generally the digest should be treated at temperatures between 120°–150° C., the flavor product of the invention having a substantially anhydrous condition at least at the end of the reaction and preferably at a sufficiently early point of the reaction to assure optimal heat treatment, thereby producing the desired "cowy" chocolate-like flavor. One such spray dryer is a Western Precipitation Company Type N spray dryer. This dryer is approximately 8' high and 3' in diameter and is of the double cone type. The drying conditions are adjusted so as to achieve drying as well as roasting of the digest in the same operation. Air temperature at the inlet varies between 240°–250° C. while the outlet temperature varies from 116°–121° C., it being understood that the temperature of reaction being intermediate the temperatures at the inlet and outlet points of the spray dryer. The digest atomized into the dryer had a solids concentration in the order of 10% and the resulting dried powder had a moisture content of less than 1%. The dried roasted product obtained had a tan color, is substantially soluble in aqueous media such as milk, water and the like, and had a "cowy" chocolaty aroma and flavor when tasted dry.

*Example 2*

An artificial chocolate flavor for use in a coating or a chocolate bar was prepared from the base flavor factor in Example 1. 0.5–5.0 parts of the base flavor factor was employed in a mix including 40–45 parts sucrose, 15–20 parts toasted cottonseed flour as a filler and a coloring agent, 0.1–0.6 part alpha-glucose penta-acetate or 0.03–0.2 part beta-glucose penta-acetate for bitterness, 0.5–3.0 parts catechu gum for astringency, and 30–40 parts by weight cocoa butter or other hard fat together with minor portions of other flavoring agents such as vanillin, ethyl vanillin, and sodium chloride, as well as color. A typical mix is as follows:

| | Parts by weight |
|---|---|
| Coating sugar | 43.75 |
| Cottonseed flour | 18.25 |
| Alpha-glucose penta-acetate | .20 |
| Sodium chloride | .05 |
| Base flavor factor | 1.00 |
| Catechu gum | 1.00 |
| Cocoa butter | 23.20 |

This mix was blended in a mixer and then put through cocoa rolls to "finish" the blended ingredients. Thereafter the finished mix was emulsified for a number of hours at an elevated temperature during which 11.5 parts cocoa butter, 0.03 part ethyl vanillin and 1.0 part lecithin were added. The resulting product was then tempered, poured into molds and cooled to hardness.

*Example 3*

A milk drink employing the base flavor factor of Example 1 was prepared by mixing 85.20 parts sugar, 0.73 part caffein, 3.65 parts catechu gum, 0.06 part sodium chloride, 3.65 parts base flavor factor, and 0.3 part by weight ethyl vanillin. Then 8.2 gms. of the mix were dissolved in 100 ml. of milk to provide a milk drink which can be consumed either hot or cold.

*Example 4*

A mix for a chocolate flavored fudge employing the base flavor factor of Example 1 is as follows:

89.66 parts of sugar
0.01 part sodium chloride
6.73 parts butter
1.67 parts base flavor factor
0.45 part caffein
1.35 parts catechu gum
0.005 part ethyl vanillin 446 gms. of this mix and coloring agents together with one cup of milk was simmered in a saucepan, poured into a flat tray, and cooled to produce the fudge product.

Example 5

A chocolate flavored frozen sherbet was prepared including the base flavor factor of Example 1 by mixing 38.86 parts sucrose
8.83 parts dextrose
47.70 parts dry corn syrup
2.65 parts base flavor factor
0.09 part sodium chloride
0.53 part caffein
1.33 parts catechu gum
0.0022 part ethyl vanillin 113 gms. of this mix was blended with one cup (236 ml.) of milk and then chilled. Thereafter the chilled product was whipped and further chilled into the form of a frozen sherbet or similar confectionery product.

Example 6

The base flavor factor of the present invention may be employed in the enhancement of natural chocolate products such as coatings using, for example, the following procedure. 32 lbs. of chocolate liquor, 15 lbs. of cocoa butter, 45 lbs. of coating sugar, 3.5 lbs. of skim milk powder, and 2 lbs. of the base flavor factor of the present invention is provided, for example, by the process of Example 1, are mixed in a regular chocolate blender heated at a temperature of 120° F., said mixing requiring about 20 minutes. On the other hand, a melangeur may be employed in place of the aforementioned blender. The blended material is then ground in a 5-roll grinder or refiner, and the liquor is then conged for about 36 hours after which additional cocoa butter is added to reduce viscosity if desired.

Example 7

The base flavor factor of the present invention as provided, for example, in accordance with the procedure of Example 1 may also be employed in an artificial chocolate coating containing cocoa powder and a specially processed coconut oil in place of cocoa butter. Said modified coconut oil is a so-called "hard butter" resulting from hydrogenation and/or fractionation. Coatings are prepared by first preparing the following two blends in accordance with the procedure set forth in Example 7.

Coating 1:

| | Pounds |
|---|---|
| Base flavor factor | 8.00 |
| Skim milk solids | 6.00 |
| Dried corn syrup solids | 5.00 |
| Sucrose | 47.50 |
| Hard butter | 32.00 |
| Emulsifier | 1.5 |
| | 100.00 |

Coating 2:

| | |
|---|---|
| Low-fat cocoa | 24.00 |
| Sucrose | 45.50 |
| Hard butter | 28.00 |
| Emulsifier | 2.5 |
| | 100.00 |

In addition to using the two coatings set forth above as such, they may also be blended, for example, by combining them in the ratio of 3 parts of coating 2 to 1 part of coating 1.

It will be understood that while the invention has been described in part by means of specific examples reference should be had to the appended claims for a definition of the scope of the invention.

What is claimed is:

1. A process for producing a chocolate base flavor factor having fragrant buttery notes comprising reacting partially hydrolyzed milk protein with milk sugar, the reaction mixture also containing hydrolyzed milk fat, said reaction being carried out by the application of heat to a mixture of the reagents at a temperature of 120°–150° C. and for a time sufficient to produce said base flavor factor in a substantially anhydrous condition at least at the end of the reaction.

2. The process of claim 1 in which the milk protein is hydrolyzed to 8–55%.

3. The process of claim 1 in which the milk protein is enzymatically degraded 8–20% and the milk fat is hydrolyzed by a lipolytic catalyst.

4. The process of claim 3 in which the catalyst is a lipase.

5. The process of claim 3 in which the lipase is trypsin.

6. The process of claim 3 in which the lipase is pancreatin.

7. The process of claim 1 in which the protein hydrolyzate contains oligopeptides.

8. A process for producing a chocolate base flavor factor having fragrant buttery notes comprising digesting whole milk by hydrolyzing its milk fat to free fatty acids therefrom and by hydrolyzing its protein 8–55%, and subjecting the digest to a temperature of 120°–150° C. for a time sufficient to produce said base flavor factor in a substantially anhydrous condition at least at the end of the reaction.

9. The process of claim 8 in which the protein hydrolyzate contains oligopeptides.

10. The process of claim 8 in which the milk fat is hydrolyzed by a lipase.

11. The process of claim 10 in which the whole milk is digested by an enzyme which serves to hydrolyze both the milk fat and the milk protein.

12. The process of claim 11 in which the enzyme is trypsin.

13. The process of claim 11 in which the enzyme is pancreatin.

14. The product of the process in claim 1.

References Cited in the file of this patent

UNITED STATES PATENTS

| 2,103,495 | Ruckdeschel | Dec. 28, 1937 |
| 2,364,008 | Stuart | Nov. 28, 1944 |
| 2,414,299 | Hall | Jan. 14, 1947 |
| 2,590,646 | Pettibone | Mar. 25, 1952 |

FOREIGN PATENTS

| 107,367 | Great Britain | Mar. 18, 1918 |

OTHER REFERENCES

"The Chemical Senses," by Moncrieff, Leonard Hill Limited, 17 Stratford Place W1, London, 1944, pages 109, 110, 196 and 239.

"The Chemistry and Technology of Food and Food Products," by Jacobs, second edition, Interscience Publishers, Inc., New York, 1951, page 1649.